United States Patent [19]
Merriweather, Jr.

[11] Patent Number: 5,632,414
[45] Date of Patent: May 27, 1997

[54] NO-TOUCH FLUID DISPENSER

[75] Inventor: Frank Merriweather, Jr., Carson, Calif.

[73] Assignee: Bobrick Washroom Equipment, Inc., North Hollywood, Calif.

[21] Appl. No.: 566,117

[22] Filed: Nov. 30, 1995

[51] Int. Cl.⁶ ................................................ B67D 5/08
[52] U.S. Cl. .................. 222/52; 222/63; 222/180; 222/333; 222/381
[58] Field of Search ................... 222/52, 61, 63, 222/173, 180, 381, 382, 383.1, 333; 4/623; 250/221

[56] References Cited

U.S. PATENT DOCUMENTS

| | | |
|---|---|---|
| 4,666,099 | 5/1987 | Hoffman et al. |
| 4,796,825 | 1/1989 | Hawkings . |
| 4,938,384 | 7/1990 | Pilolla et al. ............... 222/52 |
| 4,960,248 | 10/1990 | Bauer et al. . |
| 4,972,070 | 11/1990 | Laverty, Jr. . |
| 5,031,258 | 7/1991 | Shaw . |
| 5,226,566 | 7/1993 | Bradenburg ............... 222/180 |
| 5,476,197 | 12/1995 | Lawerence et al. ......... 222/180 |

FOREIGN PATENT DOCUMENTS

| | | |
|---|---|---|
| 2054151 | 2/1981 | United Kingdom . |
| 2097254 | 3/1982 | United Kingdom . |
| 2241888 | 9/1991 | United Kingdom . |

*Primary Examiner*—Philippe Derakshani
*Attorney, Agent, or Firm*—Pretty, Schroeder & Poplawski

[57] ABSTRACT

A fluid dispenser having a body for mounting in a counter with a spout above the counter, a escutcheon for the upper end of the shank or body, and a pump with cylinder and piston in the body, with the upper end of the piston projecting above the cylinder and connected to the spout and with the lower end of the cylinder connected to a container below the counter. An electrical solenoid is carried on the body below the counter with a moving plunger connected to the cylinder for moving the cylinder upward relative to the piston for pumping fluid from the container through the piston and out through the spout. A lamp housing is carried in the escutcheon, with an infra red source and an infra red detector mounted in the housing, and an electrical cable is connected between the lamp housing and an electrical circuit mounted adjacent the solenoid for energizing the infra red source and for energizing the solenoid in response to a signal from the infra red detector.

7 Claims, 2 Drawing Sheets

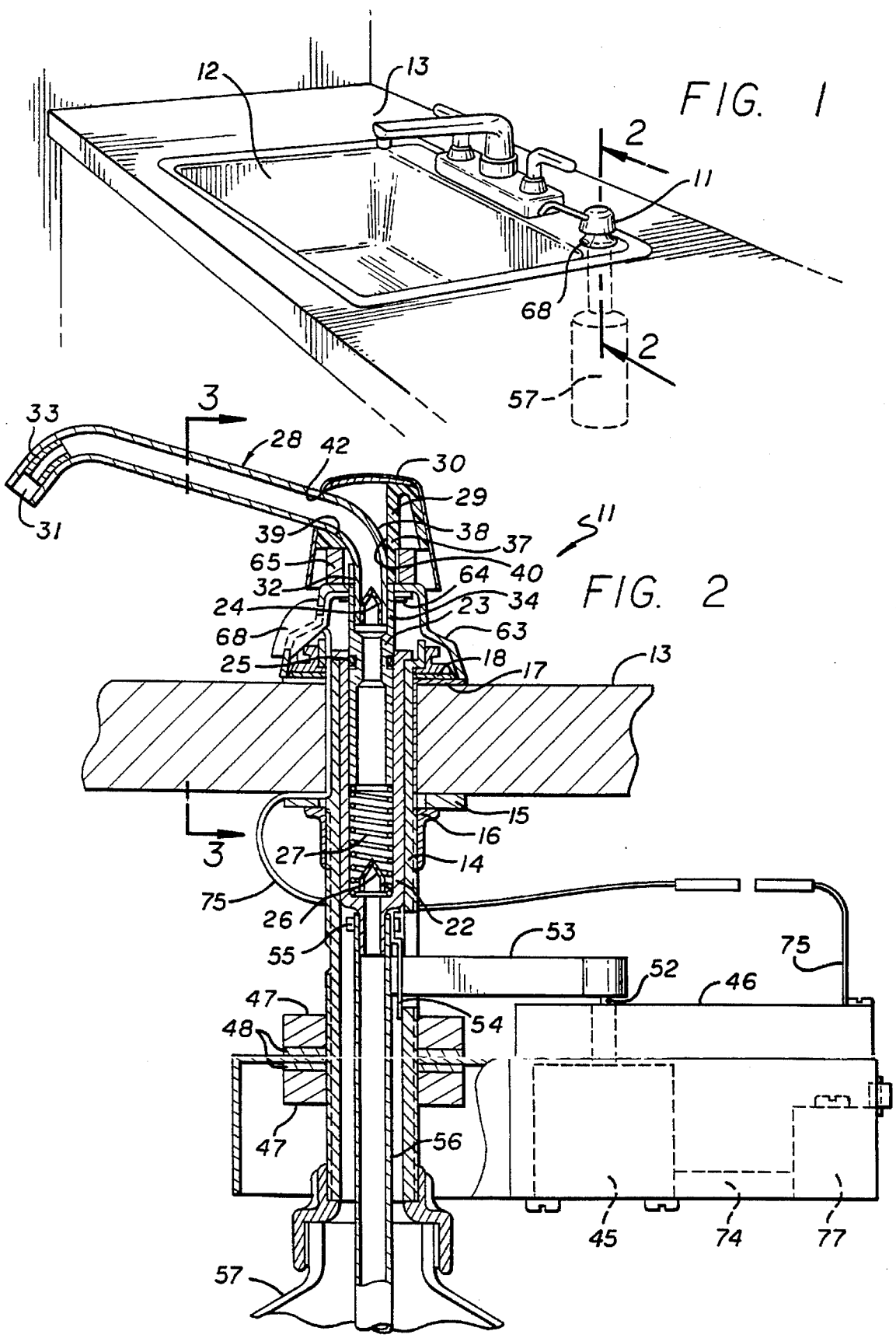

5,632,414

NO-TOUCH FLUID DISPENSER

BACKGROUND OF THE INVENTION

This invention relates to dispensers, such as are used for dispensing soaps, lotions, and similar fluids in washrooms and similar locations.

A variety of dispensers are widely used, and one example is shown in U.S. patent (U.S. Ser. No. 08/379,792 now U.S. Pat. No. 5,476,197). With this type of dispenser, a manually exerted downward force is required for dispensing fluid. In another variation, a horizontally applied manual force is required.

However, even with today's low force dispensers, it is still difficult or not possible for children and handicapped people to operate the dispenser.

Various "no-touch" type washroom devices have been produced for operating water fountains and basins, towel supply equipment and hot air drying equipment. Devices of this type are shown in U.S. Pat. Nos. 4,666,099; 4,796,825; 4,960,248; 4,972,070 and 5,031,258. These devices typically utilize an infra red sensor which produces a control signal to actuate the supply mechanism when a hand or arm is appropriately positioned near the sensor. Some devices are passive, relying on the presence of the human body. Other devices are active, utilizing an infra red source, the output of which is reflected back to the infra red sensor by the user's hand or arm.

It is an object of the present invention to provide a new and improved fluid dispenser having the "no-touch" operation. It is a particular object of the invention to provide such a dispenser which utilizes the basic construction of a proven fluid dispenser, modifying the basic construction to incorporate the infra red sensing and eliminate the manual push operation.

Other objects, advantages, features and results will more fully appear in the course of the following description.

SUMMARY OF THE INVENTION

A fluid dispenser having a body for mounting in a counter with a spout above the counter, a cover for the upper end of the body, and a pump with cylinder and piston in the body, with the upper end of the piston projecting above the cylinder and connected to the spout and with the lower end of the cylinder including means for connecting to a container below the counter. The piston and spout are fixed to the cover, an electrical solenoid is carried on the body below the counter and has a fixed coil and a moving plunger, and the solenoid plunger is connected to the cylinder for moving the cylinder upward relative to the piston for pumping fluid from the container through the piston and out through the spout.

Preferably the spout is threaded into the piston and a bushing is positioned between the spout and cover applying a downward force on the cover, with a clamp on the piston below the cover resisting the downward force. Also preferably the connector between the solenoid and pump includes a lever connected to the solenoid plunger and a bracket attached to the cylinder, with the lever passing through an opening in the body and engaging a slot in the bracket.

A lamp housing is carried in the cover, with an infra red source and an infra red detector mounted in the housing, and an electrical circuit means is mounted adjacent the solenoid for energizing the infra red source and for energizing the solenoid in response to a signal from the infra red detector, with an electrical cable connected between the lamp housing and the electrical circuit means. Preferably the lamp housing has a body and a mounting tab with an opening for receiving the piston, with the tab positioned on the piston between the cover and the clamp, and the cover has an opening for receiving the tab, with the lamp housing body on the exterior of the cover.

BRIEF DESCRIPTION OF THE DRAWINGS

FIG. 1 is a view of a wash basin with a fluid dispenser installed and incorporating the presently preferred embodiment of the invention;

FIG. 2 is an enlarged partial sectional view of the dispenser of FIG. 1;

DESCRIPTION OF THE PREFERRED EMBODIMENT

Figure 3:
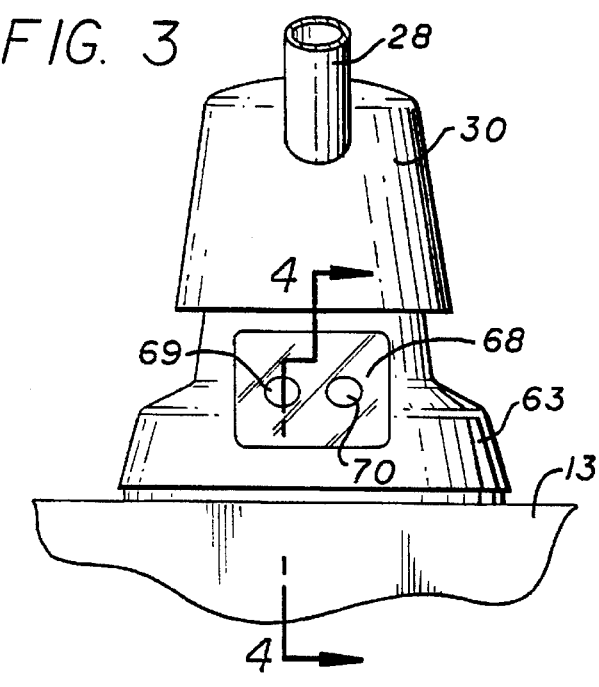
FIG. 3 is an enlarged partial sectional view taken along the line 3—3 of FIG. 2.
Figure 4:
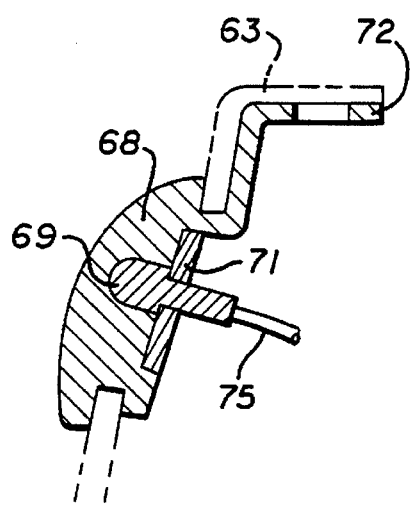
FIG. 4 is an enlarged partial sectional view taken along the line 4—4 of FIG. 3.

A typical fluid dispenser 11 is shown in FIGS. 1 and 2 installed in a wash basin 12 on a counter 13. The dispenser includes a threaded mounting sleeve or shank 14 with a lower washer 15 and nut 16 and an upper washer 17 and shank return 18.

A pump is positioned inside the sleeve 14 and includes a cylinder 22 and piston 23, with an upper one way duck bill valve 24, a U-cup seal 25 and a lower one way duck bill valve 26. A spout 28 is installed through a piston cap 29 and a shell 30.

The spout 28 has an outer end 31 which is bent downward in the conventional shape, and an inner end 32 which is also bent downward. The center section of the spout may be straight as shown in FIG. 2 or may be curved. A conventional liner 33 may be inserted in the outer end of the spout to reduce dripping, if desired.

The upper end 34 of the piston is straight, and is internally threaded. The inner end 32 of the spout is externally threaded for engaging the upper end 34 of the piston.

The piston cap 29 has a body 37 with a central opening 38 coaxial with the axis of the piston 23, and a lateral opening 39 in communication with the central opening 38. Preferably, the piston cap also has a depending sleeve 40 coaxial with the central opening 38. The spout 28 is installed on the dispenser by moving the inner end 32 of the spout in through the lateral opening 39 and down through the central opening 38, placing the threaded end of the spout into the threaded end of the piston, and rotating the spout and cap to engage the threaded portions. In the embodiment illustrated, the lower end of the sleeve 40 abuts against the upper end of the piston, with the extreme end of the spout inner end 32 clamping the upper valve 24 in place in the piston.

Typically, the shell 30 is positioned on the piston cap 29, with the lower end of the shell acting as a shroud. The shell 30 is provided with an opening 42 for passage of the spout. With this construction, the shell may be made a press fit on the piston cap, with the spout maintaining the shell in position on the piston cap.

This construction is conventional, and in the dispenser shown in U.S. patent (U.S. Ser. No. 08/379,792 now U.S.

Pat. No. 5,476,197), a downward pressure on the upper end of the piston moves the piston axially downward compressing the spring 27 and forcing fluid upward through the center of the piston to the outlet spout 28.

In contrast, in the new construction of the present invention the spout, cap and shell, and the piston are maintained stationery, and fluid is dispensed by upward movement of the cylinder 22 rather than downward movement of the piston 23.

Figure 5:
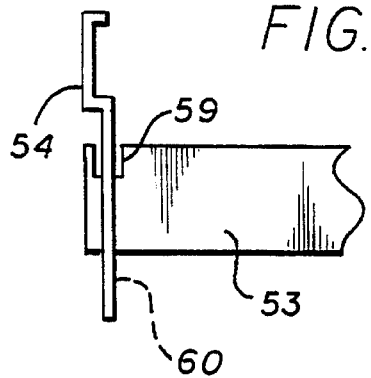
FIG. 5 is an enlarged view illustrating the engagement of the solenoid drive lever and the cylinder bracket of the dispenser drive means.
Figure 6:
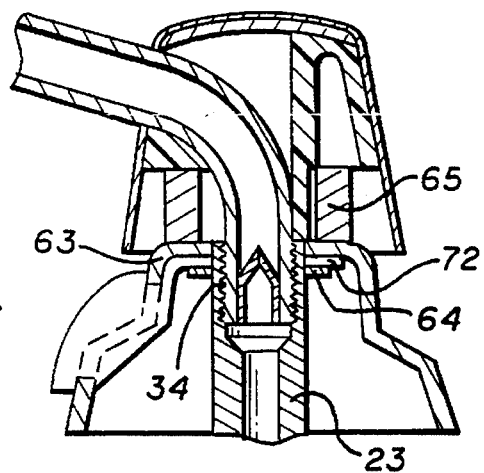
FIG. 6 is an enlarged partial view illustrating the construction at the upper end of the air piston.

A solenoid 45 is mounted in a housing 46 carried on the body or mounting sleeve shank 14 by nuts 47 and washers 48. In the embodiment illustrated, the cylinder 22 is driven by the solenoid plunger 52 through a lever 53 and a bracket 54, with the bracket connected by a clamp 55 to the cylinder 22 and also to a tube 56 running down into the fluid container 57. Typically the lever 53 is connected at one end to the plunger 52, and has a notch 59 at the other end for engaging a slot 60 in the bracket 54. See FIG. 5.

The piston and spout are fixed relative to a cover or escutcheon 63, with a C-clamp 64 in a groove near the upper end of the piston below the escutcheon, and with a bushing 65 between the cap 29 and the escutcheon 63.

A lamp housing 68 is mounted in an opening in the escutcheon 63, with an infra red radiation source 69 and an infra red radiation detector 70 held in place in openings in the housing 68 by a retainer board 71 connected to the inner surface of the housing 68. A tab 72 is provided on the housing 68, with an opening for positioning over the piston 23, below the escutcheon 63, with the C-clamp 64 holding the tab and lamp housing against the inner surface of the escutcheon 63. The lamp housing 68 is inserted into the opening in the cover escutcheon from the outside of the escutcheon, and is sufficiently resilient to have the rim of the opening in the escutcheon engage corresponding grooves in the perimeter of the housing.

The infra red source and detector are connected to an electrical circuit on a board 74 in the housing 46 by a cable 75. In the embodiment illustrated, the cable runs through the counter 13 along a slot in the shank 14 where material has been removed. Appropriate connectors may be inserted in the cable as desired. The electrical circuit on the board 74 may be connected to a power source through a connector 76. A terminal block 77 may be used if desired.

The construction and operation of the electrical circuit with the infra red source and detector is conventional. The infra red source is continuously energized. When a person desires some soap or lotion, one hand or both hands are positioned under the outer end 31 of the spout. The radiation from the infra red source is reflected from the hand back to the infra red detector, producing an electrical input into the electrical circuit, and the circuit output energizes the solenoid 45 to move the plunger 52 upward. This results in upward movement of the cylinder 22, forcing fluid upward through the piston and the valve 24, and out the spout 28. The electrical circuit can be designed to provide one upward motion of the cylinder or to provide a series of upper motions so long as the user's hand is in position under the spout. The solenoid will be deenergized after each upward motion of the cylinder, with the cylinder being returned to the rest position by the spring 27. This downward motion of the cylinder brings a fresh charge of fluid from the container 57 upward through the valve 26 into the interior of the cylinder and piston.

The no-touch basin mounted soap dispenser is more hygienic than conventional touch soap dispensers because it helps prevent the spread of germs.

I claim:

1. In a fluid dispenser having a body for mounting in a counter with a spout above the counter, an escutcheon for the upper end of the body, and a pump with cylinder and piston in the body, with the upper end of the piston projecting above the cylinder and connected to the spout and with the lower end of the cylinder including means for connecting to a container below the counter, the improvement comprising:

connector means for fixing said piston and spout to said escutcheon;

an electrical solenoid carried on said body below the counter and having a fixed coil and a moving plunger; and drive means for connecting said solenoid plunger to said cylinder for moving said cylinder upward relative to said piston for pumping fluid from the container through the piston and out through the spout.

2. A fluid dispenser as defined in claim 1 wherein said spout is threaded into said piston and said connector means includes a bushing positioned between said spout and escutcheon applying a downward force on said escutcheon, and a clamp on said piston below said escutcheon resisting said downward force.

3. A fluid dispenser as defined in claim 2 wherein said drive means includes a lever connected to said solenoid plunger and a bracket attached to said cylinder, with said lever passing through an opening in said body and engaging a slot in said bracket.

4. A fluid dispenser as defined in claim 3 including:

a lamp housing carried in said escutcheon, with an infra red source and an infra red detector mounted in said housing;

electrical circuit means mounted adjacent said solenoid for energizing said infra red source and for energizing said solenoid in response to a signal from said infra red detector; and an electrical cable connected between said lamp housing and said electrical circuit means.

5. A fluid dispenser as defined in claim 4 wherein:

said lamp housing has a body and a mounting tab with an opening for receiving said piston, with said tab positioned on said piston between said escutcheon and said clamp, and said escutcheon has an opening for receiving said tab, with said lamp housing body on the exterior of said escutcheon.

6. A fluid dispenser as defined in claim 1 including:

a lamp housing carried in said escutcheon, with an infra red source and an infra red detector mounted in said housing;

electrical circuit means mounted adjacent said solenoid for energizing said infra red source and for energizing said solenoid in response to a signal from said infra red detector; and an electrical cable connected between said lamp housing and said electrical circuit means.

7. A fluid dispenser as defined in claim 6 wherein:

said lamp housing has a body and a mounting tab with an opening for receiving said piston, with said tab fixed on said piston, and said escutcheon has an opening for receiving said tab, with said lamp housing body on the exterior of said escutcheon.

* * * * *